Patented Dec. 12, 1950

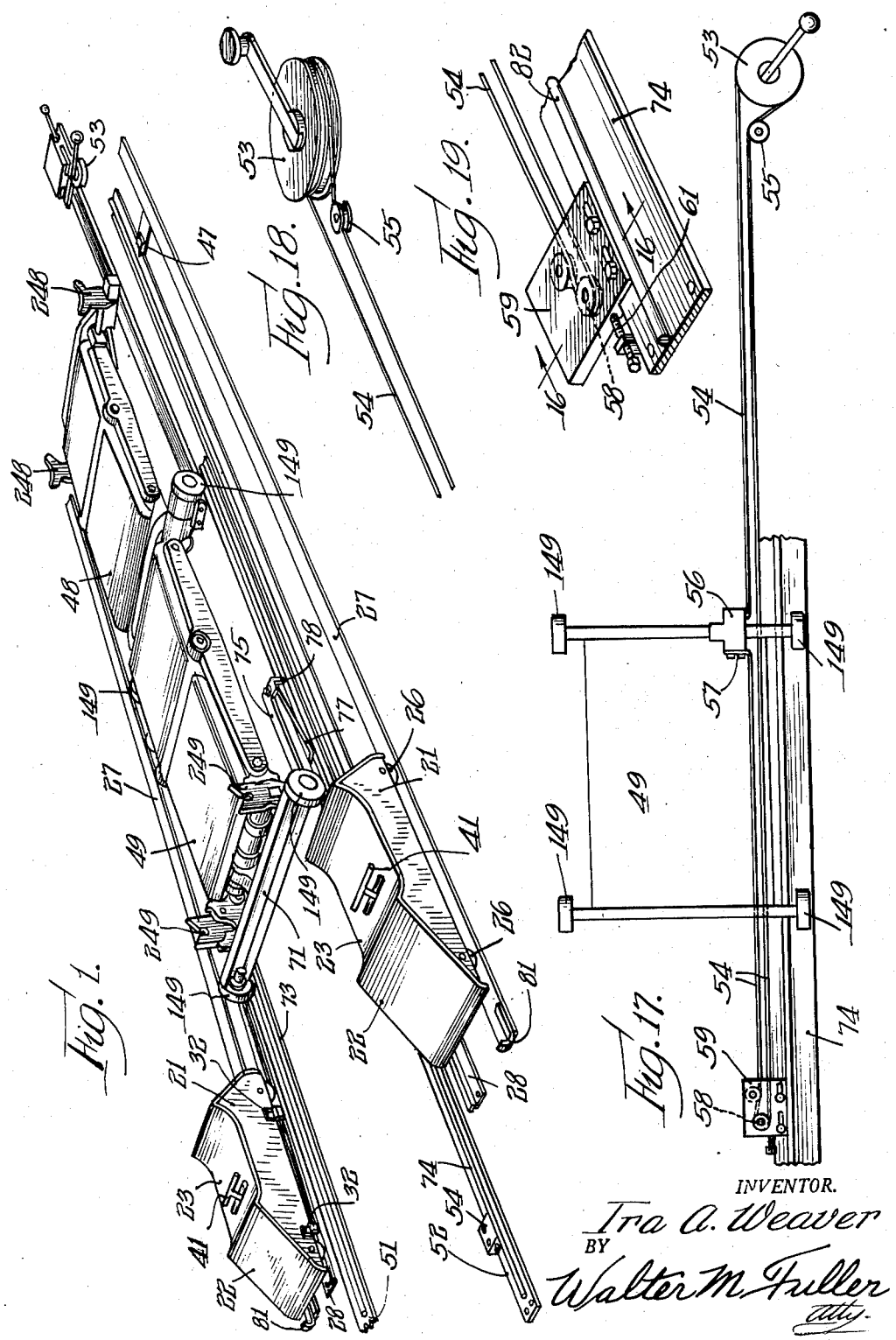

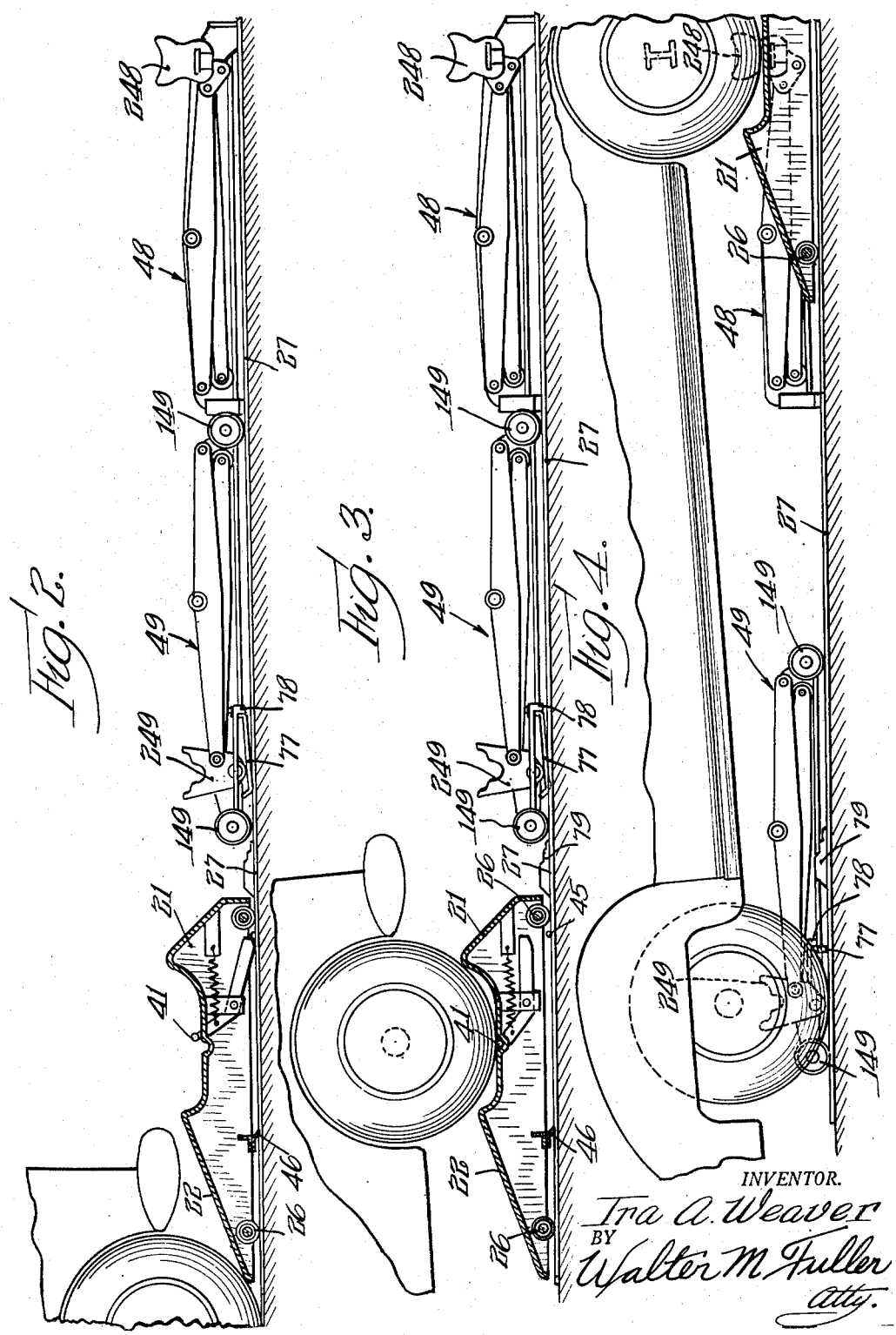

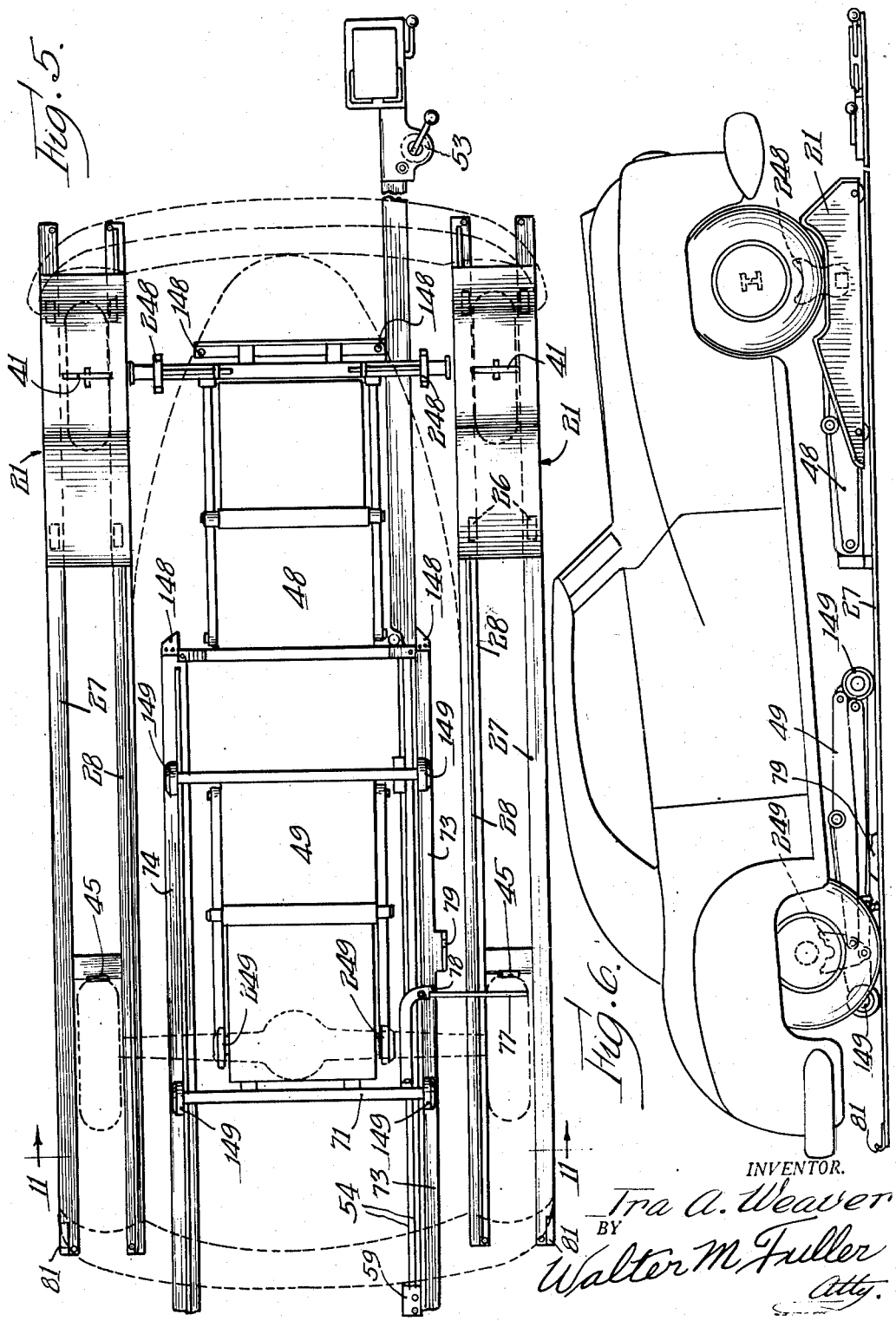

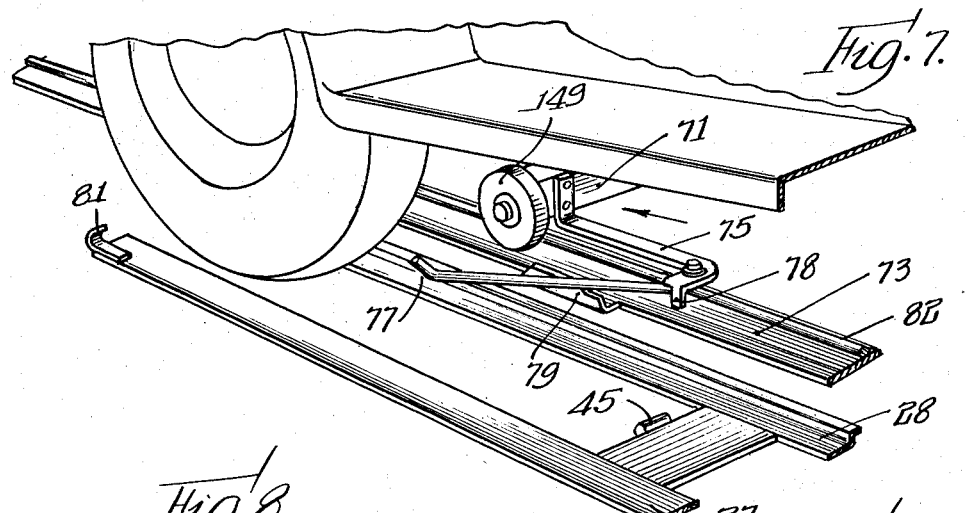
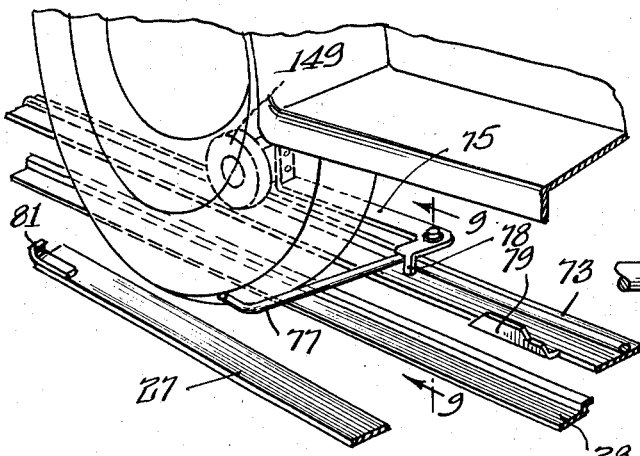
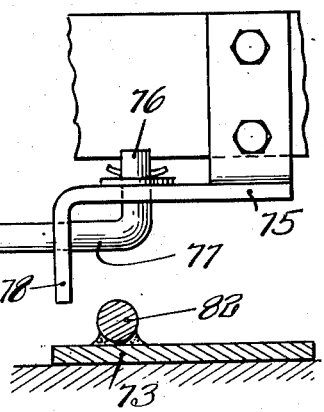
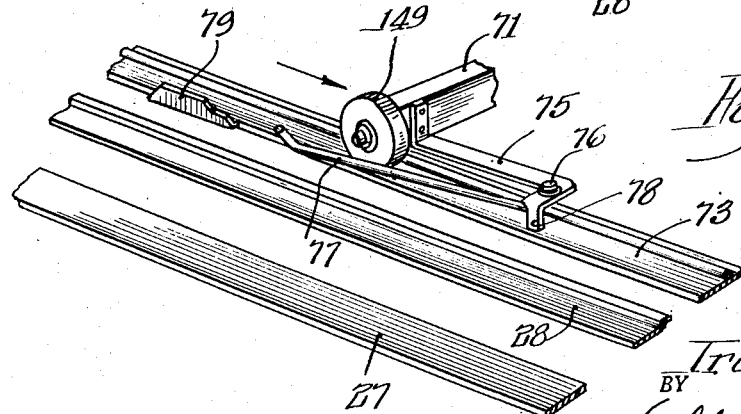

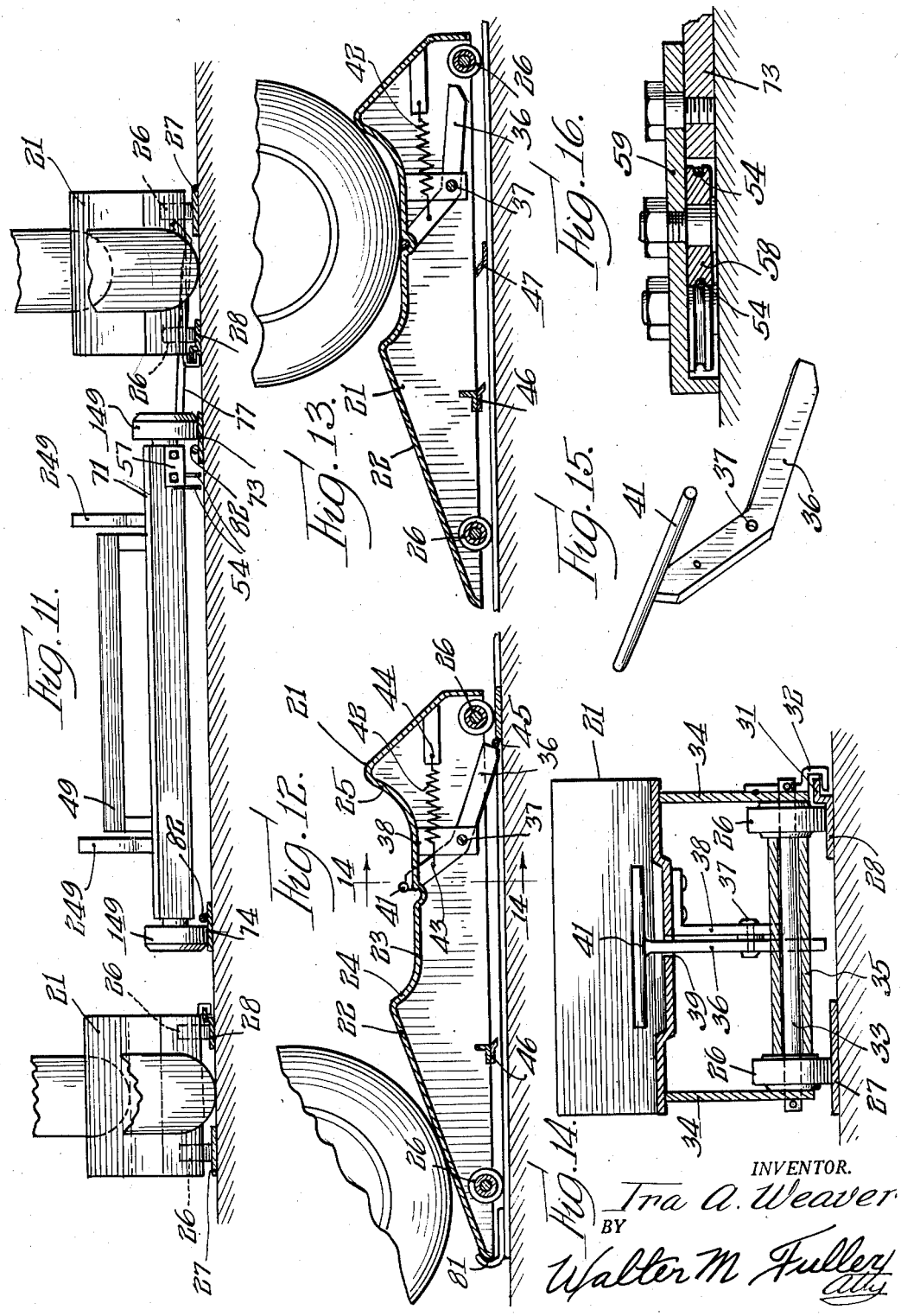

2,533,981

UNITED STATES PATENT OFFICE 2,533,981

RAMP CARRIAGE AND LOCATING MEANS FOR VEHICLE LIFTING DEVICES

Ira Adelbert Weaver, Springfield, Ill., assignor to Weaver Engineering Co., Springfield, Ill., a corporation of Illinois Application December 29, 1948, Serial No. 67,853

12 Claims. (Cl. 254—89)

The present invention relates to or concerns auxiliary or supplemental appliances used in conjunction with vehicle-lifting devices, the latter projecting above the level of the floor when in their lowest positions sufficiently to prevent the passage on the floor of the vehicle over the vehicle elevating and lowering apparatus when in such lowermost relation.

One of the primary objects or purposes of such invention is to provide complementary ramp-carriages up which the front wheels of the vehicle to be elevated and supported for servicing or inspection may be driven thereby raising such wheels adequately for the front axle or other wheel mounting portion of the vehicle to clear the upwardly located parts of the lifting mechanism.

These ramp-structures and their associated platforms upon which the elevated vehicle or automobile wheels rest are movable along the floor in the direction of car travel thereby enabling the front wheels and axle of the vehicle to move forwardly in their raised position to the proper location for the lifting device to register with the front axle or other wheel suspension means.

The rear wheels of the vehicle roll on the floor at the same time, or concurrently with the front wheels, and it is not necessary that they be similarly elevated preliminarily since the rear axle ordinarily is high enough to clear the rear vehicle-lifting unit, which is customarily somewhat lower than the front elevating and lowering unit.

It is to be understood that the vehicle-lifting appliance is of the two-unit type which rests entirely on the floor, one such unit being designed and arranged to engage and cooperate with the front axle of the vehicle, whereas the other unit is designed and disposed to engage and coact with the rear axle of the vehicle.

In the accompanying description and illustration of the invention the rear lifting unit is adjustable along the floor in the longitudinal direction of the vehicle to accommodate it to vehicles of various wheel-base lengths, the front lifting unit being fixed to the floor in any approved manner, but it is to be understood that the appliances incorporating the present invention may be so arranged as to be adaptable to a lifting device in which the rear elevating unit is fixed and the front one adjustable, for various wheel-base lengths.

As a part of this invention and, therefore, also illustrated and described herewith, is an attachment for easily and accurately locating the rear lifting unit in the correct position for coacting and lifting the rear axle of the car quickly and without the necessity of the operator looking under the rear of the vehicle to see if the unit is in the correct position.

Stated somewhat otherwise, these two devices, the movable ramp-carriages and the rear elevating unit adjusting device are both incorporated in this description since they are both essential component parts of the two-unit, or dual, top-of-the-floor, type or style of vehicle lifting and lowering appliance.

In order that those acquainted with or skilled in this art may fully understand this invention and the advantages accruing from its employment and the manner in which the specified and other desirable objects and aims are secured, a present preferred embodiment of the invention has been illustrated in detail in the accompanying drawings in the several views of which like reference numerals have been employed to designate the same parts.

In these drawings—

Figure 1 is a perspective view of the dual or duplex vehicle lifting appliances with the one for elevating the rear part of the vehicle to the left of the other, as shown in the drawings, and with the two transversely aligned ramp-carriages for accommodating the front wheels of the vehicle in initial or preliminary inoperative or unregistered position with relation to the front lifting device, the two rails for each of such ramp-carriages being illustrated for guiding them in their travel for proper alignment with the vehicle elevating front unit, two other rails also being shown for guiding the forward and rearward travel of the lifting unit for the back portion of the vehicle;

Figure 2 is a side view of both the front and back lifting devices and one such ramp-carriage in longitudinal section before the vehicle wheel shown in such figure has rolled up the incline of the ramp;

Figure 3 is the same type of view after the automobile has ascended the inclined portion of the ramp and its front wheel is located in the chuck, saddle or clutch thereof, the ramp-carriages having been automatically unlocked and ready for travel forward by the power of the rear wheels of the automobile;

Figure 4 presents one of the two front wheels of the automobile in the same position on its ramp-carriages as in Figure 3, but located at a different position with respect to the front lifting appliance, and it also indicates one of the two rear wheels of the automobile after the back lifting device has been properly registered with such rear wheels;

Figure 5 depicts a more or less diagrammatic plan view of the two lifting devices in register with their corresponding parts of the vehicle, the front wheels resting on the two companion ramp-carriages, the rear wheels resting on the floor;

Figure 6 is a side elevation of the automobile and the parts referred to, as shown in Figure 5 ready for the car lifting operation;

Figure 7 illustrates a gauge arm which co-operates with one of the rear wheels of the vehicle to line up the rear lifting apparatus with its portion of the automobile;

Figure 8 is a similar view of the elements shown in Figure 7 but with the gauge arm in contact with the tread of one of the rear wheels;

Figure 9 illustrates a portion of the same arm in a different position;

Figure 10 presents such gauge arm in retracted relation, that is to say, it is a perspective view showing the operation of the parts illustrated in Figures 7, 8 and 9;

Figure 11 is a section taken on line 11—11 of Figure 5 as viewed in the direction indicated by the arrows;

Figure 12 portrays one of the front wheels of the vehicle climbing its particular ramp, which is shown in longitudinal section;

Figure 13 is a sectional view similar to that of Figure 12 with the vehicle front wheel in the chuck, saddle or clutch portion of its ramp carriage;

Figure 14 is a cross-section taken on line 14—14 of Figure 12, but on a larger scale;

Figure 15 portrays a perspective view of the locking link or member of the ramp-carriage shown in Figures 12, 13 and 14;

Figure 16 is a detailed section taken on line 16—16 of Figure 19;

Figure 17 is a diagrammatic view of the cable construction and its mode of operation;

Figure 18 is a perspective view of the windlass which operates the cable; and

Figure 19 is a perspective view of a portion of the cable appliance for tightening the cable when required, and shown in Figure 17.

Referring first to Figures 1 to 6, inclusive, it will be noted that the front power-actuated vehicle lifting and lowering unit 48 of any suitable or appropriate construction is fastened to the floor at the four points 148 (Fig. 5) and it is not equipped with carrying-wheels or tracks but is permanently anchored in the position depicted, its vehicle contacting and raising and lowering duplex member adapted to engage the front axle of the car to be serviced, being designated 248, 248 (Figs. 1, 2, 3, 4, 5 and 6).

On the other hand, the back vehicle elevating and lowering unit 49 (Figs. 1, 2, 3, 4, 5 and 6), also of any convenient and expedient structure, has an appropriate and suitable dual power-operated vehicle raising and lowering element 249, 249, the frame of such appliance 49 being mounted on four carrying wheels 149, 149, 149, 149 adapted to roll on and carry such appliance on the two tracks 73 and 74 (Figs. 1 and 5), the constructions of the wheels or tracks, or both, being such that the wheels cannot be inadvertently or accidentally dislodged (Fig. 1) from such tracks, which are so located that the two elevating and lowering devices 48 and 49 can be brought into longitudinal alignment and adjacent one another as shown in Figure 1, and the movable one 49 can be shifted on the tracks by means described hereinafter to be directly in contact with one another.

Outside of track 73 and also outside of track 74 are a pair of tracks on which the two ramps 21, 21 are adapted to travel just beyond the two sides of the two vehicle lifting and lowering mechanisms 48 and 49, as is clearly shown in Figures 1 and 11.

Each of the two sheet metal ramps 21, 21 has a forwardly, upwardly, inclined flat top surface up which the corresponding front wheel of the automobile to be serviced is adapted to climb simultaneously with the corresponding action of the other front vehicle wheel with relation to its companion ramp while the two ramps are in transverse register in the position indicated in Figure 1.

At the top of this inclination 22 each ramp-carriage has an intermediate, substantially level, longitudinal, wheel supporting portion 23 with upwardly curved end sections 24 and 25, respectively (Fig. 12), which it is apparent form a wheel chuck or saddle to prevent the automobile wheel from inadvertently or accidentally rolling off such level platform portion 23, the end section 25 being higher than the other or companion section 24 reducing or preventing any possibility of the wheel climbing over the higher part thereof, the back upward portion 24 being lower than the other part 25 so that by exerting slight additional force by the wheel when desired the wheel may be made to climb backwardly over such rear part 24 when removing the vehicle from the ramp-carriages.

Each of such ramp-carriages is supported on four carrying-wheels 26, 26 (Figs. 1, 2, 3, 4, 11, 12, 13 and 14), which in turn are adapted to roll or travel on the corresponding rails 27 and 28 (Fig. 14), one of such rails 27 being a flat elongated blade whereas the other mating rail 28 has a narrow, longitudinal, elevated flange 31 with which two spaced-apart, suitably mounted blocks 32, 32, welded to the side wall of the ramp-carriage (Figs. 1 and 4), coacts to maintain the travel of the ramp-carriages in a straight line, thus guiding each ramp-carriage in a straight forward and back direction, although it will be readily understood that any other convenient conventional method of guiding along the rails could be equally well employed.

As indicated, for instance in Figure 14, each pair of ramp carrying-wheels 26, 26 are held apart on a transverse shaft 33 rotatable in bearings in the side-walls 34, 34 of the metal ramp-carriage, the wheels 26, 26 being held apart by a sleeve 35 on the shaft so that the one carrying-wheel 26 is adajacent to and bears against the flange 31 of its rail whereby the ramp-carriage is properly guided in its travel on the two rails.

In order to maintain these two ramp-carriages stationary and in transverse register with one another while the two automobile front carrying-wheels are driven up their inclines onto their intermediate chuck or saddle portions the interior of each ramp-carriage accommodates a lock-bar 36, Figures 12, 13, 14 and 15, fulcrumed at 37, on a suitable support 38, such element or link 36 extending up through a slot 39 (Fig. 14) in the top of the ramp-chuck with the exposed upper end of such bar having fixedly mounted thereon a cylindrical cross-bar 41, the construction being such that while the vehicle wheel is climbing up the surface 22 the ramp-carriage cannot move forwardly on its rails because a coiled contractile spring 42, attached at one end to the element 36 at 43, and at a bar fixed in the ramp-carriage at 44 (Fig. 12), holds the lower end of the bar down against a fixed stop 45 on one of the rails.

Upon entrance of such automobile wheel into the chuck or saddle portion of the ramp-carriage it engages the bar 41 of arm 36 and depresses or rocks it so that its lower end rises above the stop 45 whereby the ramp-carriage is then free to proceed to perform its traveling function, and as the vehicle is carried forwardly by its own power through its rear wheels on the floor it carries both front wheels and the two ramp-carriages forwardly on their tracks until the two stops 46 rigidly mounted on the bottoms of the ramp-carriages simultaneously engage the transversely registered fixed stops 47 (Fig. 13) near the opposite ends of the two rails which brings its axle or other proper support of the vehicle into correct register with the lifting means 248, 248 (Figs. 1, 2, 3, 4, 5 and 6) of the appliance 48.

After the front wheels of the automobile have been run onto their ramp-carriages, the latter automatically unlocked and the vehicle driven forwardly to bring the front axle into register with the front elevating and lowering means 248, the companion, back elevating and lowering unit 49 having been initially brought up near its companion unit 48 as shown in Figure 1, it is then drawn backwardly on its own rails 73 and 74 to register with the back axle depending upon the wheelbase length of the particular vehicle to undergo servicing or inspection in elevated condition, and this movement of the back lifting unit 49 is performed manually by means about to be described.

A manually operated windlass 53 (Figures 17 and 18) has a cable or cord 54 wound one and one-half times around the drum of the windlass, as indicated in Figure 18, one portion of the cable extending also around an idler pulley 55 to maintain the cable properly wound around the windlass, as will be readily understood.

One strand of the cable or cord 54 is divided and at one end of such division is fastened to the rear unit lift 49, shown diagrammatically only in Figure 17 at 56, and the other end of the cable or cord system is fastened at 57 to the same unit 49, and then at its terminal portion indicated at the left in Figure 17 the cable passes part way around pulley 58 and in order that undue slackness in the cable or cord may be gotten rid of by adjustment of the pulley 58, such pulley is mounted on a slotted plate 59 adjustable by a suitable screw 61 (Figure 19).

In Figure 1, 71 is one of the cross-bars of the rear elevating and lowering unit 49, equipped with four supporting wheels 149 on the tracks 73 and 74 on which such unit travels, the same bar 71 and supporting wheels 149 being also illustrated in Figures 7, 8 and 10.

As is indicated in Figures 7, 8, 9 and 10, a right-angle supporting bar 75 is fixedly mounted on the element 71 and has somewhat loosely fulcrumed thereon at 76 (Figs. 9 and 10) a gauge rod 77 whereby such rod may rock downwardly somewhat and drag on the ground so that as the rear unit lift construction is moved forwardly or to the right as viewed in Figure 1 this arm 77, which has a somewhat curved outer end, moves along the ground and naturally swings rearwardly as shown in Figures 7 and 10 having first been retracted in such movement by riding over a cam 79 (Figs. 7, 8 and 10) fastened to one of the rails and is, therefore, out of the way of the path of travel of the adjacent rear vehicle wheel shown in Figures 7 and 8.

When the rear lifting unit 49 is caused to travel back by the cable actuated by the operator the bar 77 by contact with the ground rocks and stands straight out in front of such rear wheel being limited and prevented from rocking further by the vertical edge 78 of the supporting arm 75, and when such member 77 contacts with the tread of the tire of such rear wheel of the vehicle it terminates movement of the cable preventing it from traveling further and this indicates to the operator that the rear axle or other part with which the back unit is to coact is correctly registered with its portion of the car whereby both axles are accurately aligned with their lifts and the elevation of the car can proceed.

Stated in other words, in this particular instance, the rear axle of the automobile has also been placed in correct register with the rear lifting device and this fact is communicated to the operator through the cable, as indicated above, which lifting apparatus is directly connected to the cable and its manually actuated mechanisms, as shown diagrammatically in Figure 17, so that the operator ceases attempting to retract the back lift further.

After the servicing of the automobile has been completed and ended, and when the rear lift is moved forwardly up to the front lift this gauge-bar 77 will automatically assume its retracted position out of the way, as shown in Figure 10, because of the action of the 79 up and over which it rides and in so doing swings it back to inactive position being restored to operative relation and contact with the tire of the wheel during the backward movement of the rear lifting unit, as indicated above.

As a safety measure, in order to prevent the ramp-carriages from leaving their tracks after the work on the car has been performed in its elevated relation and then restored to its ground position, the automobile and the two ramp-carriages are drawn back to the position shown in Figure 1 by the power of the rear wheels which are on the floor, and when these ramp-carriages reach the position shown in Figure 1 such carriages engage other terminal stops 81, 81 (Figs. 1, 5, 6, 7, 8 and 12) so that continued rearward movement of the automobile causes the front wheels to ride over the humps 24 of the chucks and then roll down the inclined surfaces 22 back to the floor so that the automobile has been restored to its original condition on the floor, free from all appliances, and the two ramp-carriages are automatically locked in transverse register with one another ready to receive the next automobile to be serviced.

As indicated above, while the two ramps are thus temporarily locked in crosswise registration with one another the two front wheels of the vehicle are caused to climb their inclined surfaces, enter their chucks and at the same time and automatically unlock the carriages and continued forward movement of the car is carried out while the front wheels are occupying the ramp-chucks the rear wheels of the car on the floor advancing the car, the front vehicle wheels are thus carried in their chucks to the ends of their tracks at which positions their front wheels will be automatically stopped in proper register with the stationary front lifting unit and then the back lifting unit is manually caused through the cable means to travel rearwardly until it properly registers with the rear axle and then the lifting and lowering, etc. of the entire automobile can be performed after which the vehicle can be backed up while the rear wheels are on the floor, the front wheels finally descending rearwardly from the ramps and the car is then free for service.

If by any chance both lifts should be too high in their lowermost positions for the vehicle to pass over them no difficulty would be experienced by any person skilled in the art in adapting the means disclosed herein for the elevation of the front wheels by ramps to employ that or analogous means for all four wheels except that some other method of carrying the automobile forwardly with all four wheels elevated could easily be devised.

Those acquainted with this art will readily understand that the invention as defined in the appended claims is not necessarily limited and restricted to the precise and exact details of structure and performance and that reasonable modifications may be availed of without departure from the heart and essence of the invention and without the loss or sacrifice of any of its material benefits.

It may be noted that the present invention may be so employed as to be adaptable to a lifting device in which the rear lifting unit is fixed to the floor and the other unit used adjustably for various wheelbase lengths.

It is to be observed that since the hinged, rockable, wheel contact bar 77 becomes extended over one of the rails of the track upon which the corresponding ramp-carriage travels it is necessary to swing such bar inwardly to remove its conflict with the ramp-carriage but after the vehicle has been lowered to the floor the rear lifting unit is moved forward by operation of the windlass and this inward swinging is caused by the contact of arm 77 with cam 79 which is beveled at both ends, the arm passing by and over such stationary cam during such return of the rear lifting mechanism to its initial inoperative position, and the arm becomes automatically moved during the latter rearward movement of the rear lift to a position perpendicular to the line of travel of the parts and contacts the vertical edge 78 of the supporting bracket and can turn no further in that direction but is capable of riding over the cam 79 in such reverse direction of travel ultimately contacting the tread of the rear wheel tire which finally determines the correct positioning.

It will be understood that all tracks located on the floor are anchored to the latter, and that each of the tracks for the rear lift 49 has welded to it a longitudinal rod 82 (Fig. 9) the length of the track to keep the wheels 149 of the lifting mechanism from running sidewise off their tracks 73 and 74.

I claim:

1. For use with a power-actuated fixedly located vehicle lifting-and-lowering appliance, the combination of track-means fixedly positioned at opposite sides of said appliance, a pair of ramp-carriages having supporting wheels thereon adapted to roll on said track-means toward and from said appliance, each said ramp-carriage having an upwardly inclined top terminal surface up which carriages two corresponding wheels of the vehicle are adapted to ascend simultaneously, each such carriage at the top of its said inclined surface having a vehicle-wheel elevated chuck forming part of the ramp-carriage and into which chuck the corresponding vehicle-wheel is delivered from the top end of said inclined surface, means to automatically lock said ramp-carriages in transverse register with one another against forward travel on said track-means during the ascent of the vehicle-wheels on said inclined surfaces, means to automatically unlock said ramp-carriages after the ascent of the vehicle-wheels has been completed and the vehicle-wheels have entered their corresponding chucks, and means to automatically stop travel on said track-means of the two ramp-carriages and their loads when they have traveled a predetermined distance to be in proper register with said lifting-and-lowering appliance for the lifting of the vehicle by said lifting-and-lowering appliance.

2. The combination set forth in claim 1, including also in said combination means at the rear end of said track means to stop backward travel of said ramp-carriages to permit the vehicle-wheels to be removed from said chucks and descend to the ground by rolling down the inclined surfaces of the ramp-carriages.

3. The combination set forth in claim 1, including in addition in said combination the feature that each ramp-carriage chuck has a front wall and a back wall adjacent the top of the inclined surface, said front wall extending higher than said back wall, both of said walls being fixed with relation to one another.

4. The combination set forth in claim 1, including in addition in said combination the feature that each ramp-carriage chuck has a vertically curved back wall adjacent the top of the inclined surface of the ramp-carriage, said front wall extending higher than said back wall, both of said walls being fixed with relation to one another.

5. The combination set forth in claim 1, including in addition in said combination the feature that each ramp-carriage chuck has a front wall, and a back wall, the latter being adjacent the top of the inclined surface of the ramp-carriage, said front wall extending higher than said back wall and a stationary stop engaged by the back of each ramp-carriage to allow the vehicle-wheel in its chuck to ride over the back wall of the chuck and roll down its inclined surface to free the automobile for service.

6. The combination set forth in claim 1, including in addition in said combination the feature that each ramp-carriage chuck has a vertically curved front wall, and a vertically curved back wall, the latter being adjacent the top of the inclined surface of the ramp-carriage, said front wall extending higher than said back wall, and a stationary stop engaged by the back of each ramp-carriage to allow the vehicle-wheel in its chuck to ride over the curved back wall of the chuck and roll down its inclined surface to free the automobile for service.

7. The combination set forth in claim 1, in which said means to lock and unlock said ramp-carriages is in each instance a lever fulcrumed in its ramp-carriage and extending into its vehicle wheel chuck, a fixed stop below said carriage, a spring automatically rocking said lever against said stop, the vehicle-wheel when in said ramp-carriage chuck rocking said lever and maintaining it released from said stop.

8. For use with separate aligned front and rear power-operated vehicle lifting-and-lowering units, said front unit being fixedly located, said rear unit being mounted on rollers adapted to travel on tracks fixed in alignment with said front unit, the combination of track-means fixed on opposite sides of said vehicle lifting-and-lowering units, a pair of companion ramp-carriages supported on rollers adapted to travel on and to guide their ramp-carriages by said track-means, each said ramp-carriage having a top, terminal, upwardly inclined ramp surface up which a pair of front wheels of the vehicle are adapted to climb simultaneously, said carriages including elevated vehicle wheel chucks on the ramp-carriage forward of their inclined surfaces and adapted to be entered and occupied by the elevated front wheels of the vehicle, means to lock said companion ramp-carriages in transverse register against forward travel on said track-means during the upward travel of the vehicle front wheels on their inclined ramp-surfaces, means to automatically unlock said ramp-carriages to permit forward travel thereof after the vehicle-wheels have completed their ascents up the ramps and their delivery therefrom into their chucks, means to automatically stop the forward travel of said carriages on said track-means when they have traveled a predetermined distance to be in proper register for the performance of their lifting function by their fixedly located vehicle lifting-and-lowering unit, means to move said rear lifting-and-lowering unit rearwardly on its tracks, and means to automatically end such rearward movement when such lifting unit reaches its proper registration with the back portion of the vehicle to perform its lifting function therewith.

9. The combination set forth in claim 8, including also in the combination means to move said rear unit forwardly on its tracks toward said front unit ahead of its correct rear registration point.

10. The combination set forth in claim 8, including also in the combination means to move said rear unit rearwardly and forwardly on its tracks, a gauge arm fulcrumed on said rear unit adapted to be swung out to contact the tread of one of the rear tires of the vehicle to determine when said rear unit is in proper register with the rear portion of the vehicle to perform its lifting function.

11. The combination set forth in claim 8, including also in the combination means to move said rear unit forwardly and rearwardly on its tracks, a gauge arm fulcrumed on said rear unit, cam means to swing said arm to inoperative position as the rear unit is moved forwardly, and cam means to swing said arm outwardly into position to engage the tread of a tire on a rear wheel of the vehicle before the rear unit in its rearward travel reaches correct registration with the rear portion of the vehicle to perform its liftting function which is determined when such arm contacts the tread of the tire and is in a position where it can not move further.

12. The combination set forth in claim 8, including also in the combination a manually operated windlass and associated cable fastened to the rear lifting-and-lowering unit to move such rear unit forwardly and rearwardly on its tracks, a gauge arm fulcrumed on said rear unit, cam means to swing said arm to inoperative position as the rear unit is moved forwardly, and cam means to swing said gauge arm outwardly into position to engage the tread of a tire on a rear wheel of the vehicle before said rear unit in its rearward travel reaches correct registration with the rear portion of the vehicle to perform its lifting function which is determined when said arm contacts the tread of the tire and is in a position where it can not move further from the tire.

IRA ADELBERT WEAVER.

REFERENCES CITED

The following references are of record in the file of this patent:

UNITED STATES PATENTS

| Number | Name | Date |
| --- | --- | --- |
| 2,285,989 | Kroll | June 9, 1942 |